US009772948B2

(12) United States Patent
Sawin et al.

(10) Patent No.: US 9,772,948 B2
(45) Date of Patent: Sep. 26, 2017

(54) DETERMINING A CRITERION FOR MOVEMENT OF DATA FROM A PRIMARY CACHE TO A SECONDARY CACHE

(75) Inventors: James David Sawin, Sterling, MA (US); Luke W. Friendshuh, Elko, MN (US); Sumanth Jannyavula Venkata, Shakopee, MN (US); Ryan James Goss, Prior Lake, MN (US); Mark Allen Gaertner, Vadnais Heights, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 625 days.

(21) Appl. No.: 13/543,123

(22) Filed: Jul. 6, 2012

(65) Prior Publication Data

US 2014/0013053 A1   Jan. 9, 2014

(51) Int. Cl.
| | | |
|---|---|---|
| G06F 12/00 | (2006.01) | |
| G06F 12/0873 | (2016.01) | |
| G06F 12/0862 | (2016.01) | |
| G06F 12/0811 | (2016.01) | |

(52) U.S. Cl.
CPC ...... *G06F 12/0873* (2013.01); *G06F 12/0811* (2013.01); *G06F 12/0862* (2013.01)

(58) Field of Classification Search
CPC .......................... G06F 12/0862; G06F 12/0811
USPC ....................................................... 711/122
See application file for complete search history.

(56) References Cited

U.S. PATENT DOCUMENTS

| | | |
|---|---|---|
| 4,899,230 A | 2/1990 | Sherritt |
| 5,274,768 A | 12/1993 | Traw et al. |
| 5,420,998 A | 5/1995 | Horning |
| 5,644,789 A | 7/1997 | Matthews et al. |
| 6,339,811 B1 | 1/2002 | Gaertner et al. |
| 6,549,992 B1 | 4/2003 | Armangau et al. |
| 6,571,318 B1 | 5/2003 | Sander et al. |
| 6,948,015 B2 | 9/2005 | Ogasawara et al. |
| 6,976,147 B1 | 12/2005 | Isaac et al. |
| 7,181,578 B1 | 2/2007 | Guha et al. |
| 7,305,526 B2 | 12/2007 | Benhase et al. |
| 7,613,876 B2 | 11/2009 | Bruce et al. |
| 7,769,970 B1 | 8/2010 | Yeh et al. |
| 7,836,259 B1 | 11/2010 | Filippo et al. |

(Continued)

OTHER PUBLICATIONS

Ahmadi et al., "A Cache Architecture for Counting Bloom Filters", 15th IEEE International Conference on Networks, 2007, pp. 218-223.

(Continued)

*Primary Examiner* — Prasith Thammavong
(74) *Attorney, Agent, or Firm* — Hollingsworth Davis, LLC (57) ABSTRACT

A new segment of data is copied to a volatile, primary cache based on a host data read access request. The primary cache mirrors a first portion of a non-volatile main storage criterion is determined for movement of data from the primary cache to a non-volatile, secondary cache that mirrors a second portion of the main storage. The criterion gives higher priority to segments having addresses not yet selected for reading by the host. In response to the new segment of data being copied to the primary cache, a selected segment of data is copied from the primary cache to the secondary cache in response to the selected segment satisfying the criterion.

16 Claims, 5 Drawing Sheets

(56) References Cited

U.S. PATENT DOCUMENTS

| | | |
|---|---|---|
| 7,979,631 B2 | 7/2011 | Ahn et al. |
| 7,996,642 B1 | 8/2011 | Smith |
| 8,015,360 B2 | 9/2011 | Hong et al. |
| 8,032,700 B2 | 10/2011 | Bruce et al. |
| 8,195,881 B2 | 6/2012 | Bohn et al. |
| 8,341,339 B1 | 12/2012 | Boyle et al. |
| 8,489,820 B1* | 7/2013 | Ellard ............... 711/138 |
| 8,583,879 B2 | 11/2013 | Na et al. |
| 2002/0002655 A1 | 1/2002 | Hoskins |
| 2002/0176430 A1 | 11/2002 | Sangha et al. |
| 2003/0105937 A1 | 6/2003 | Cooksey et al. |
| 2003/0105938 A1* | 6/2003 | Cooksey et al. ......... 711/203 |
| 2003/0105940 A1 | 6/2003 | Cooksey et al. |
| 2003/0196042 A1 | 10/2003 | Hopeman et al. |
| 2003/0200393 A1 | 10/2003 | Cornaby et al. |
| 2004/0123043 A1* | 6/2004 | Rotithor et al. ......... 711/137 |
| 2004/0210642 A1* | 10/2004 | Mekkittikul ...... H04L 29/06027 709/213 |
| 2005/0108491 A1 | 5/2005 | Wong et al. |
| 2005/0114606 A1* | 5/2005 | Matick ............... G06F 12/122 711/134 |
| 2005/0172074 A1 | 8/2005 | Sinclair |
| 2006/0184949 A1 | 8/2006 | Craddock et al. |
| 2006/0248387 A1 | 11/2006 | Nicholson et al. |
| 2007/0022241 A1 | 1/2007 | Sinclair |
| 2007/0136523 A1* | 6/2007 | Bonella et al. ......... 711/113 |
| 2007/0250665 A1 | 10/2007 | Shimada |
| 2007/0288692 A1 | 12/2007 | Bruce et al. |
| 2008/0059694 A1 | 3/2008 | Lee |
| 2008/0162849 A1* | 7/2008 | Savagaonkar ........ G06F 12/145 711/163 |
| 2008/0209131 A1* | 8/2008 | Kornegay ............ G06F 12/121 711/135 |
| 2008/0288751 A1 | 11/2008 | Kocev |
| 2009/0055595 A1* | 2/2009 | Gill ............... G06F 12/0862 711/137 |
| 2009/0089501 A1* | 4/2009 | Ahn et al. ............. 711/113 |
| 2009/0106481 A1 | 4/2009 | Yang et al. |
| 2009/0157918 A1 | 6/2009 | Jin et al. |
| 2009/0193193 A1 | 7/2009 | Kern |
| 2009/0300628 A1 | 12/2009 | Patil et al. |
| 2010/0023682 A1 | 1/2010 | Lee |
| 2010/0095053 A1 | 4/2010 | Bruce et al. |
| 2010/0115172 A1 | 5/2010 | Gillingham et al. |
| 2010/0217952 A1 | 8/2010 | Iyer et al. |
| 2010/0325352 A1 | 12/2010 | Schuette et al. |
| 2011/0055458 A1 | 3/2011 | Kuehne |
| 2011/0145489 A1 | 6/2011 | Yu et al. |
| 2012/0191936 A1 | 7/2012 | Ebsen et al. |
| 2012/0210041 A1 | 8/2012 | Flynn et al. |
| 2012/0266175 A1 | 10/2012 | Zheng |
| 2012/0311237 A1 | 12/2012 | Park |
| 2012/0311269 A1 | 12/2012 | Loh et al. |
| 2012/0317364 A1 | 12/2012 | Loh |
| 2013/0024625 A1* | 1/2013 | Benhase et al. ......... 711/136 |
| 2013/0179486 A1 | 7/2013 | Lee et al. |
| 2013/0191601 A1 | 7/2013 | Peterson et al. |
| 2013/0212319 A1 | 8/2013 | Hida et al. |
| 2013/0246688 A1 | 9/2013 | Kanno et al. |
| 2013/0268728 A1 | 10/2013 | Ramanujan et al. |
| 2013/0339617 A1* | 12/2013 | Averbouch et al. ......... 711/133 |
| 2014/0013025 A1 | 1/2014 | Venkata |
| 2014/0013026 A1 | 1/2014 | Venkata et al. |
| 2014/0013027 A1 | 1/2014 | Venkata et al. |
| 2014/0013047 A1 | 1/2014 | Sawin et al. |
| 2014/0013052 A1 | 1/2014 | Sawin et al. |
| 2014/0013053 A1 | 1/2014 | Sawin et al. |
| 2014/0207997 A1 | 7/2014 | Peterson et al. |
| 2014/0241092 A1 | 8/2014 | Ha |
| 2014/0281134 A1 | 9/2014 | Eitan et al. |
| 2015/0033226 A1 | 1/2015 | Phelan et al. |
| 2015/0058525 A1 | 2/2015 | Venkata |
| 2015/0058526 A1 | 2/2015 | Venkata |
| 2015/0058527 A1 | 2/2015 | Venkata |
| 2015/0058683 A1 | 2/2015 | Venkata |

OTHER PUBLICATIONS

File History for U.S. Appl. No. 13/542,990, 137 pages.
File History for U.S. Appl. No. 13/543,036, 157 pages.
File History for U.S. Appl. No. 13/543,303, 294 pages.
File History for U.S. Appl. No. 13/543,036, 253 pages.
File History for U.S. Appl. No. 13/542,990, 239 pages.
File History for U.S. Appl. No. 13/543,303, 395 pages.
File History for U.S. Appl. No. 13/542,990, 303 pages.
File History for U.S. Appl. No. 13/542,990, 354 pages.

\* cited by examiner

DETERMINING A CRITERION FOR MOVEMENT OF DATA FROM A PRIMARY CACHE TO A SECONDARY CACHE

CROSS-REFERENCE TO RELATED APPLICATIONS

U.S. patent application Ser. Nos. 13/542,990 and 13/543,036 are hereby incorporated by reference.

SUMMARY

The present disclosure is related to systems and methods that facilitate determining a criterion for movement of data from a primary cache to a secondary cache. In one embodiment, a new segment of data is copied to a volatile, primary cache based on a host data read access request. The primary cache mirrors a first portion of a non-volatile main storage criterion is determined for movement of data from the primary cache to a non-volatile, secondary cache that mirrors a second portion of the main storage. The criterion gives higher priority to segments having addresses not yet selected for reading by the host. In response to the new segment of data being copied to the primary cache, a selected segment of data is copied from the primary cache to the secondary cache in response to the selected segment satisfying the criterion.

These and other features and aspects of various embodiments may be understood in view of the following detailed discussion and accompanying drawings

BRIEF DESCRIPTION OF THE DRAWINGS

In the following diagrams, the same reference numbers may be used to identify similar/same components in multiple figures.

DETAILED DESCRIPTION

In the following description of various example embodiments, reference is made to the accompanying drawings that form a part hereof, and in which is shown by way of illustration various example embodiments. It is to be understood that other embodiments may be utilized, as structural and operational changes may be made without departing from the scope of the claims appended hereto.

The present disclosure is generally related to data storage devices, such as solid-state, hybrid, hard disk drives (HDDs). Generally, a hybrid HDD utilizes a combination of non-volatile, solid-state memory (e.g., flash memory) and conventional HDD media (e.g., magnetic disks) to provide performance approaching that of a solid-state drive (SSD), yet without the costs commonly associated with SSDs. In the present disclosure, a hybrid drive architecture is described that uses an SSD as a non-volatile cache for HDD media, and is sometimes referred to as an HDD/SSD hybrid storage device. However, it will be appreciated that the concepts described herein may be applicable to any data storage device that utilizes similar caching mechanisms.

An HDD/SSD hybrid drive combines features and technologies of conventional HDDs and SSDs. A hybrid drive may include a main storage (e.g., one or more rotating magnetic disks), a volatile primary cache, and a non-volatile secondary cache. The primary cache may use a relatively small amount of volatile random access memory (RAM), while the secondary cache may uses a relatively large amount of non-volatile solid state memory that is kept coherent with the main storage. The description below is directed to, among other things, a scheme for selecting data to be moved into the secondary cache. The scheme may be tailored to optimize performance under certain environments, such as enterprise storage or other uses where the drive may be highly/fully utilized.

Figure 1:
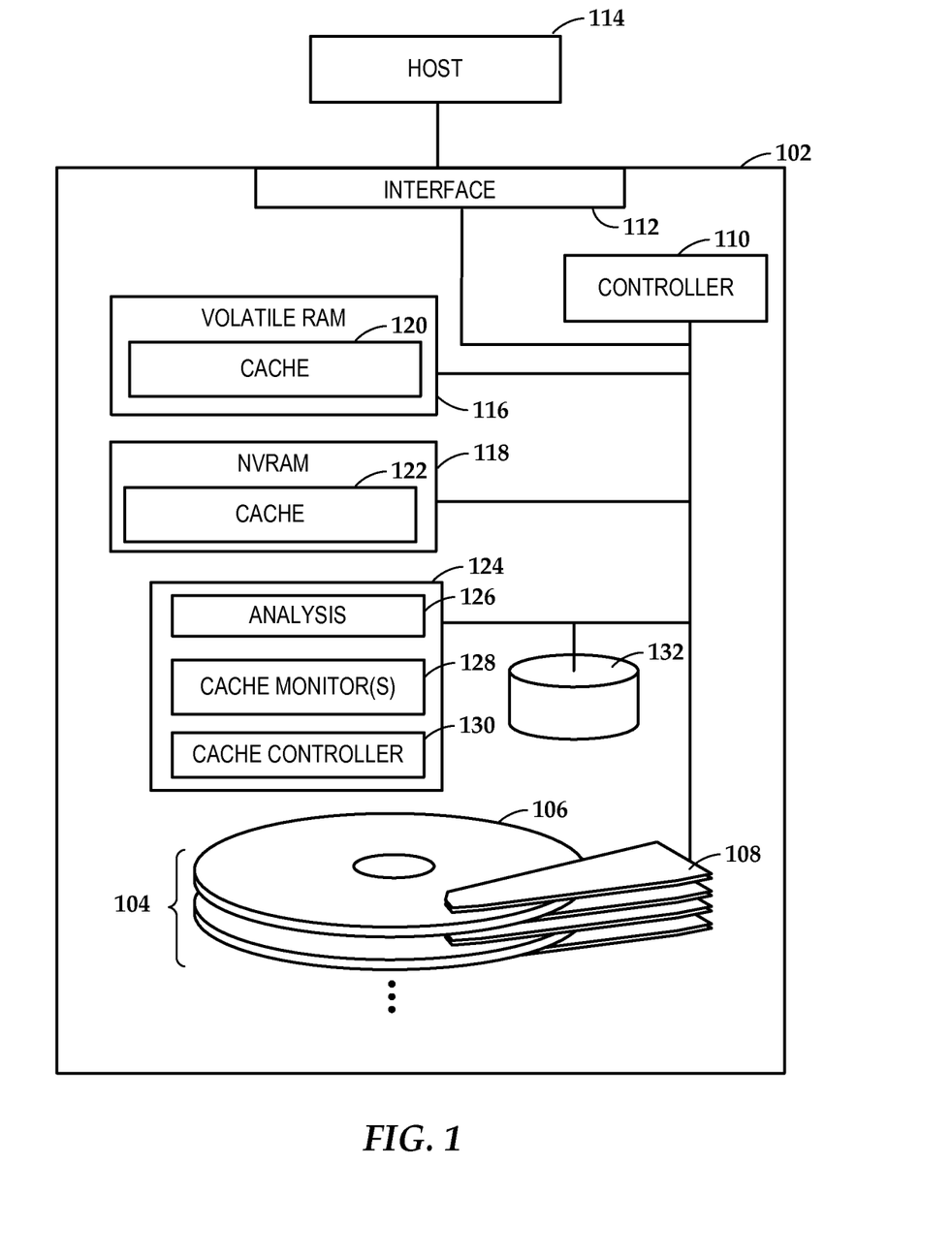
FIG. 1 is a block diagram of an apparatus according to an example embodiment.

In reference now to FIG. 1, a block diagram illustrates an apparatus 102 that includes caching features according to an example embodiment. The apparatus 102 includes main storage 104 that, in this example, includes one or more magnetic disks 106 as storage media. The disks 106 store data as magnetic patterns that are read by sensors (e.g., magnetic read/write sensors) mounted on a pivoting arm assembly 108. A controller 110 is coupled to the arm assembly and controls movement of the arm via an actuator (not shown). The controller 110 sends and receives signals (e.g., via encoder and decoder circuits, not shown) to/from one or more read/write heads on the arms, the signals ultimately being converted to data stored on the main storage 104. While this embodiment shows rotating magnetic disks 106, the concepts described below may be applicable to alternate non-volatile main storage media, including optical or solid-state media.

The apparatus 102 includes a host interface 112 that communicatively couples the apparatus 102 to a host 114. The host interface 112 at least provides a mechanism that allows the host 114 to store and retrieve information to/from the main storage 104. The host interface 112 may utilize standard communication interfaces and protocols, such as SATA, SCSI, eSATA, SAS, USB, etc. The host interface 112 may provide both a standard means of communication between the apparatus 102 and host 114, as well as abstracting operations of the controller 110 and main storage 104. For example, the host 114 may access data by way of logical block addresses (LBAs) that are mapped to a different physical addressing scheme used internally by the apparatus 102, e.g., a physical address scheme based on cylinders, heads, and sectors of the disks 106.

The controller 110 may utilize various internal adaptations of the apparatus 102 to improve performance or otherwise provide efficient operation with the host 114. For example, the apparatus 102 may include a volatile random-access memory (RAM) 116, such as Dynamic-RAM (DRAM). The apparatus 102 may also include non-volatile RAM (NVRAM) 118, such as NAND flash memory. These memory devices 116, 118 may have a number of different uses, such as acting as temporary and permanent stores for data needed internally by the controller 110 during operation. The memory devices 116, 118 may also be used for caching host data, as represented by respective caches 120, 122.

Data retrieved from main storage 104 can be held in one or more caches 120, 122 to improve throughput. The caches 120, 122 have faster access and retrieval times than the main storage 104, although generally with less storage capacity.

While there is some processing and data transfer overhead in using the one or more caches 120, 122, the faster media used by the cache can improve data access performance of the apparatus 102 under many conditions. Generally, data access may include at least host read and/or write requests, and the caches 120, 122 may be configured to mirror equivalent data (e.g., referenced by the same logical block address) in portions of the main storage 104.

In the illustrated configuration, the non-volatile cache 122 is configured as a secondary cache, being faster and smaller than the main storage 104. The volatile cache 120 is a primary cache, being faster and smaller than the secondary, non-volatile cache 122. Generally, the terms "primary" and "secondary" refer generally to hierarchy of time and/or priority relative to commands received via the host interface 112. For example, current read/write requests from the host 114 may be processed first via the primary cache 120 (e.g., identified by the data's logical block address). This enables host commands to complete quickly should the requested data be stored in the primary cache 120. If there is a miss in the primary cache 120, the requested data may be searched for in the secondary cache 122. If not found in either, requested data may be processed via the main storage 104.

While the secondary cache 122 is described herein as non-volatile, the concepts may be equally applicable to a secondary cache that uses volatile memory. For example, non-volatile memory may be chosen as secondary cache media for cost considerations and not for data retention upon loss of power. In such a case, the system may be configured so that no state information is stored for recovery of the secondary cache should power be unexpectedly be lost. In such a configuration, it may be possible to substitute volatile memory in place of the non-volatile memory without loss of functionality, because the data retention capability of the non-volatile memory is not being used.

Some of the data stored in the primary cache 120 may either be copied or moved to the secondary cache 122 as new requests come in. The copying/movement from primary cache 120 to secondary cache 122 may also occur in response to other events, e.g., a background scan. Both copying and moving involve placing a copy of data associated with an LBA range in the secondary cache, and moving may further involve freeing up some the LBA range in the primary cache for other uses, e.g., storing newly cached data.

The secondary cache 122 in this example may optionally be read-only, in that only data marked for read operations by the host 114 are placed in the secondary, non-volatile cache 122. In such a configuration, data marked for writing (write data) are sent directly to the main storage 104, either directly from the host interface 112 or via the primary, volatile cache 120. In some applications and configurations (e.g., enterprise storage), it has been found that writing to NVRAM 118 instead of the main storage 104 may not provide sufficient performance improvements to justify the overhead needed to track and synchronize write operations between the secondary cache 122 and main storage 104.

The apparatus 102 includes functional modules 124 that perform various functions related to moving data in and out of the caches 120, 122. These modules 124 may include any combination of custom logic circuitry, general-purpose processors/controllers, firmware, and software. The modules 124 include an analysis controller module 126 configured to determine one or more criteria associated with the host operations. The criteria may be at least indicative of costs associated with moving data in and out of the primary and/or secondary caches 120, 122, and importance of the data in regards to caching in the primary and/or secondary caches 120, 122.

The analysis controller module 126 may track history of address ranges, and may assign an importance metric to the address ranges that influence whether the ranges should be targeted for the primary cache 120 and/or secondary cache 122. Examples of determining cache importance metrics are described in U.S. patent application Ser. No. 13/542,990 that has been incorporated by reference.

The importance metrics may also be used to determine the importance of both newly requested data and currently cached blocks of data. Metrics of cached data can be compared to the same metric applied to a block of unrequested, speculative read data that is being considered for caching. If the importance metric of the speculative data meets or exceeds that of the cached data, the speculative data can be loaded from the main storage 104 and cached, which may cause eviction of the currently cached data from at least one of the caches 120, 122 or movement therebetween.

The analysis controller module 126 may also define optimum ranges of speculative data to be pulled from the main storage 104 into at least one of the caches 120, 122 for purposes of fulfilling host read requests. Due to certain conditions (e.g., a latency incurred in later retrieving the data) it may be beneficial to speculatively read data that has not been requested but is proximate to host requested data on the disk. Examples of how speculative cache ranges may be determined are described in U.S. patent application Ser. No. 13/543,036, which has been incorporated by reference.

The size of the speculative range may depend on characteristics of the caches 120, 122 and expected use conditions of the storage apparatus 102. For example, it may be more efficient to place speculative data in the caches 120, 122 that fills out an entire line of the secondary cache 122. The speculative data may include data that is before the requested block (read look-behind) or after the host-requested data (read look-ahead). The speculative data may be placed in one or both caches 120, 122 when fulfilling the immediate request, in the anticipation that the unrequested, speculative data may be the subject of a later request.

One or more cache monitors 128 may track operations affecting both the primary and secondary caches 120, 122, and cause cache controller module 130 (discussed further below) to perform certain actions to cached data based on system policies. Generally, the cache monitor 128 may track conditions used by the cache controller module 130 to evict data from one of the caches 120, 122 or move data between caches 120, 122. Where the caches 120, 122 are configured to be independent, e.g., not storing the same mirrored data of the main storage 104, then moving data may involve copying data associated with an LBA range to the one cache and removing data of the LBA range from the other cache. There may be a single cache monitor 128 that monitors both primary and secondary caches 120, 122, or the functionality may be separately provided individual monitors associated with each of the caches 120, 122.

The cache controller module 130 is configured to cause data from the main storage 104 to be copied to the volatile cache 120 and/or non-volatile cache 122. The cache controller 130 may control both primary and secondary caches 120, 122, or the functionality may be separately provided by individual controller modules associated with each cache 120, 122. The cache controller module 130 may be coupled to any combination of the cache monitor 128, main storage 104, controller 110, host interface 112, and caches 120, 122 to cause transfers of data to the caches 120, 122. Any combination of the criteria and speculative read metadata can be stored in a database 132. The database 132 may be coupled to any of the modules 124, as well as being coupled to other components of the device 102.

Figure 2:
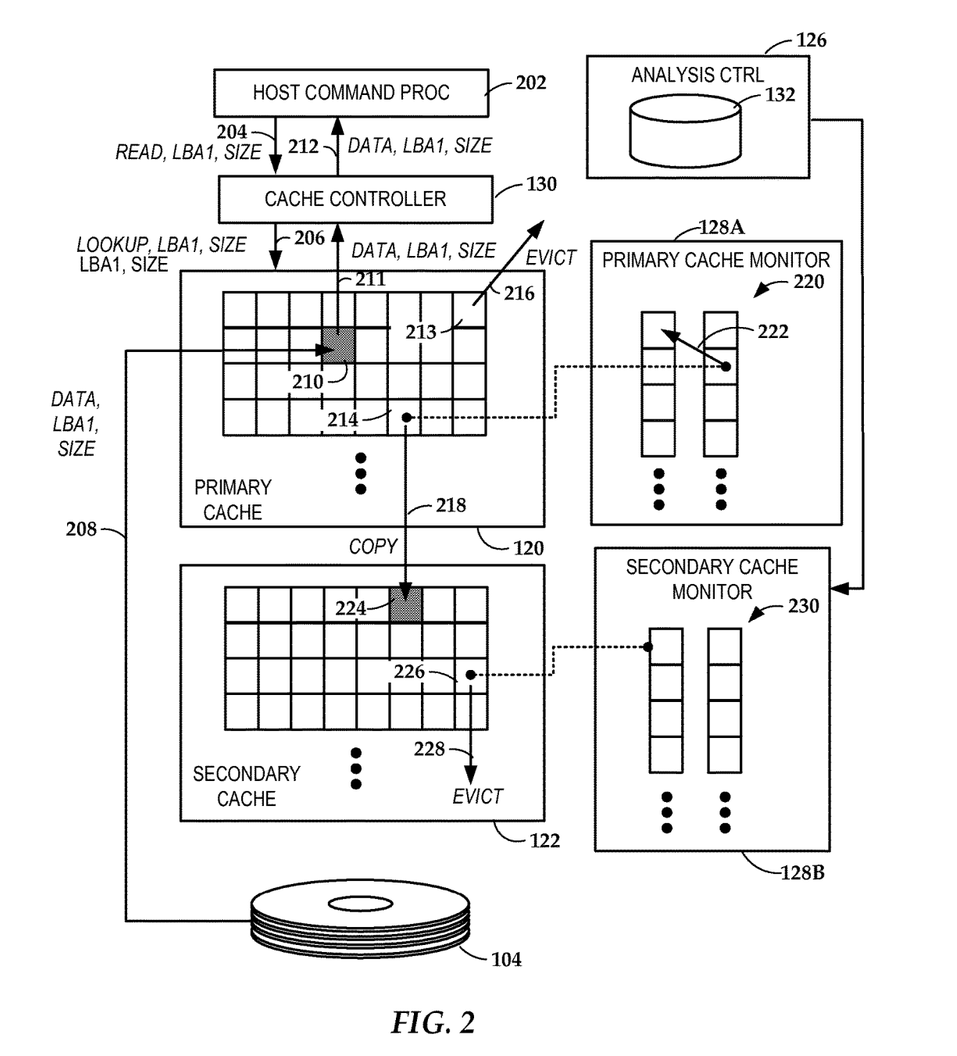
FIG. 2 is a block diagram illustrating examples of cache monitoring and control according to example embodiments.

In reference now to FIG. 2, a block diagram illustrates an example of cache monitoring and control using various modules shown in FIG. 1. A host command processor 202 processes commands received via a host interface (e.g., host interface 112 in FIG. 1). The command processor 202 may queue, de-queue, sort, prioritize, and otherwise process commands that cause data to be written to and read from a storage device. Example command 204 is a host request for data, at starting address LBA1 and length=SIZE. This command 204 is first directed to the cache controller 130, which will perform a lookup 206 in the primary cache 120 and, if needed, the secondary cache 122. This may be performed using a single lookup 206, or may involve a second lookup request (not shown) directed to the secondary cache 122.

In this example, it may be assumed that the lookup 206 results in a cache miss in both the primary cache 120 and the secondary cache 122. In response to the cache miss, the data corresponding to LBA1 is retrieved 208 from the main storage 104 and placed in the primary cache 120 at location 210. The data is also returned 211, 212 to the host command processor 202 for communication to the host. While path 211 indicates the data is read from location 210 of the primary cache 120, it may be returned directly to the controller 130 from the main storage 104 before, during or after being placed in the cache 120. Subsequent requests for LBA1 will return 211, 212 the data directly from the primary cache 120, until such time that the data is evicted.

In order to make room for addition 208 of the data to location 210 of the primary cache 120, a corresponding amount of data from another cache location 213 may need to be evicted 216 from the primary cache 120 The selection of the location 213 for eviction is based on data maintained by a cache monitor 128A of the primary cache 120. It should be noted that the policy for eviction from the primary cache 120 may be separate and independent from the policy for copying data from the primary cache 120 to the secondary cache 122. For example, although data being copied to the primary cache 120 may trigger copying of data from primary to secondary caches 120, 122, this is not necessarily done to free up space in the primary cache. This event may be a convenient trigger to evaluate data for the secondary cache, and may also be in response to other conditions discussed below, such as high spatial locality of host read history.

In this example, the primary cache monitor 128A maintains sorted lists 220 of metadata related to priority of segments within the primary cache 120. In this disclosure, the term "list" is used generically, and may be include using any data collection structure known in the art, e.g., array, linked list, set, map, binary tree, etc. Each cache segment identified in the cache priority lists 220 may correspond to a fixed-size data unit of the cache 120 (e.g., integer number of cache lines) or may be variable sized data units (e.g., corresponding to a contiguous ranges of LBAs, where the range of each segment may be different sizes). For purposes of this illustration, each block of data in the primary cache 120 corresponds to a variable length segment, a segment generally referring to a range of LBAs that are acted on together (e.g., contiguous range).

The primary cache monitor 128A may use the lists 220 as part of a multi-level priority scheme. One level of priority is based on the usage type of the data (e.g., write, read, promoted). Another level of priority is based on the order of access to the data (e.g., least recently used, most recently used). The result of this assignment of priority is the set of lists 220, one list for each usage type, where each list is sorted from most recently used (MRU) to least recently used (LRU). Finding an eviction candidate involves first locating a non-empty list with the lowest retention priority, and then selecting the LRU element from that list.

The usage-type lists can be used to efficiently filter candidate data based on read usage. For example, a usage type of "promoted" is given lower retention priority in the primary cache 120. Usage types of "read" and "write" have the next higher orders of priority, in that order. When a read segment (e.g., segment 214) is copied 218 to cluster 224 of the secondary cache 122, the primary cache entry in lists 220 related to segment 214 may be lowered in retention priority by moving it from a "read" list to a "promoted" list, as indicated by arrow 222. This may only be done if all of the cluster-aligned data from the entry 214 has been copied to the secondary cache 122. Otherwise, the entry remains on the "read" list of the primary cache 120 but may be marked "do not promote" to prevent repeated selection.

Besides usage type, the cache monitor 128A may maintain other attributes of primary cache entries related to promotion of primary cache segments to the secondary cache 122. This metadata may be stored in one or more of the lists 220. These attributes may include, "reserved for promotion," "promoted to flash cache," "prohibit promotion reservation," etc. These attributes may be used in determining whether to evict a segment from primary cache 120, as well as controlling whether the segment is copied to the secondary cache 122.

The analysis controller 126 may be used to determine a cache importance metric of segments such as described in U.S. patent application Ser. No. 13/542,990. This metric may take on a value within a numerical range (e.g., 1-10) and the metric may be adjusted over time. For example, some data may have this importance metric determined at the time the data was requested, e.g., in cases where the metric triggered the obtaining of speculative data from the primary storage along with the requested data. In other cases, this metric may be determined later, e.g., when determining whether to copy non-speculative data to the secondary cache.

The cache importance metric, along with other cache metadata noted above, may govern the selection of a segment such as 214 for copying to the secondary cache. For example, as long as a primary cache segment is marked with "promoted to flash cache" or "prohibit promotion reservation" attributes, it will not be considered for copying to the secondary cache. Also, a logical address range of the primary cache segments may govern whether or not they are eligible for copying to the secondary cache. For example, segments may have to satisfy size and alignment conditions of the secondary cache in order for its LBA range to be eligible for copying.

The copying 214 of data in segment 214 to the secondary cache 122 may trigger an eviction 228 of a cluster of data from the secondary cache 122. For purposes of this discussion, the term "cluster" will be used to annotate ranges of data within the secondary cache 122. Similar to a segment of the primary cache 120, a cluster generally refers to a range of LBAs within the secondary cache 122 that are acted on together. As with the primary cache 120, it is assumed in this example that the secondary cache 122 has at least one cluster 224 ready to receive the data, although another cluster 226 may need to be evicted 228, either immediately or some time thereafter, in order to facilitate insertion into cluster 224. A secondary cache monitor 128B may maintain a separate list 230 for purposes of determining priorities of the secondary cache 122.

The secondary cache priority list 230 may maintain a set of metrics targeted to clusters within the secondary cache 122. These metrics may at least include the last access time, and may be maintained in response to events such recent host interface activity. Elements of the list 230 may make reference to fixed or variable sized clusters of the secondary cache 122, and a single insertion may include multiple evictions 228 from the secondary cache 122. The secondary cache monitor 128B may also access cache importance metrics data from analysis controller 126 and/or database 132, e.g., using one or more LBAs as an index.

It should be noted that in this example, the secondary cache 122 is assumed to be read-only, and so eviction 228 is shown as the only option. However, if the secondary cache 122 is configured to store both read and write data, then another option (not shown) may be to sync the data with the main storage 104 before clearing the cluster 224 for other uses. Similarly, if the primary cache 120 stores read/write data, then eviction 216 may also involve synchronizing the cached data with the main storage 104.

Figure 3:
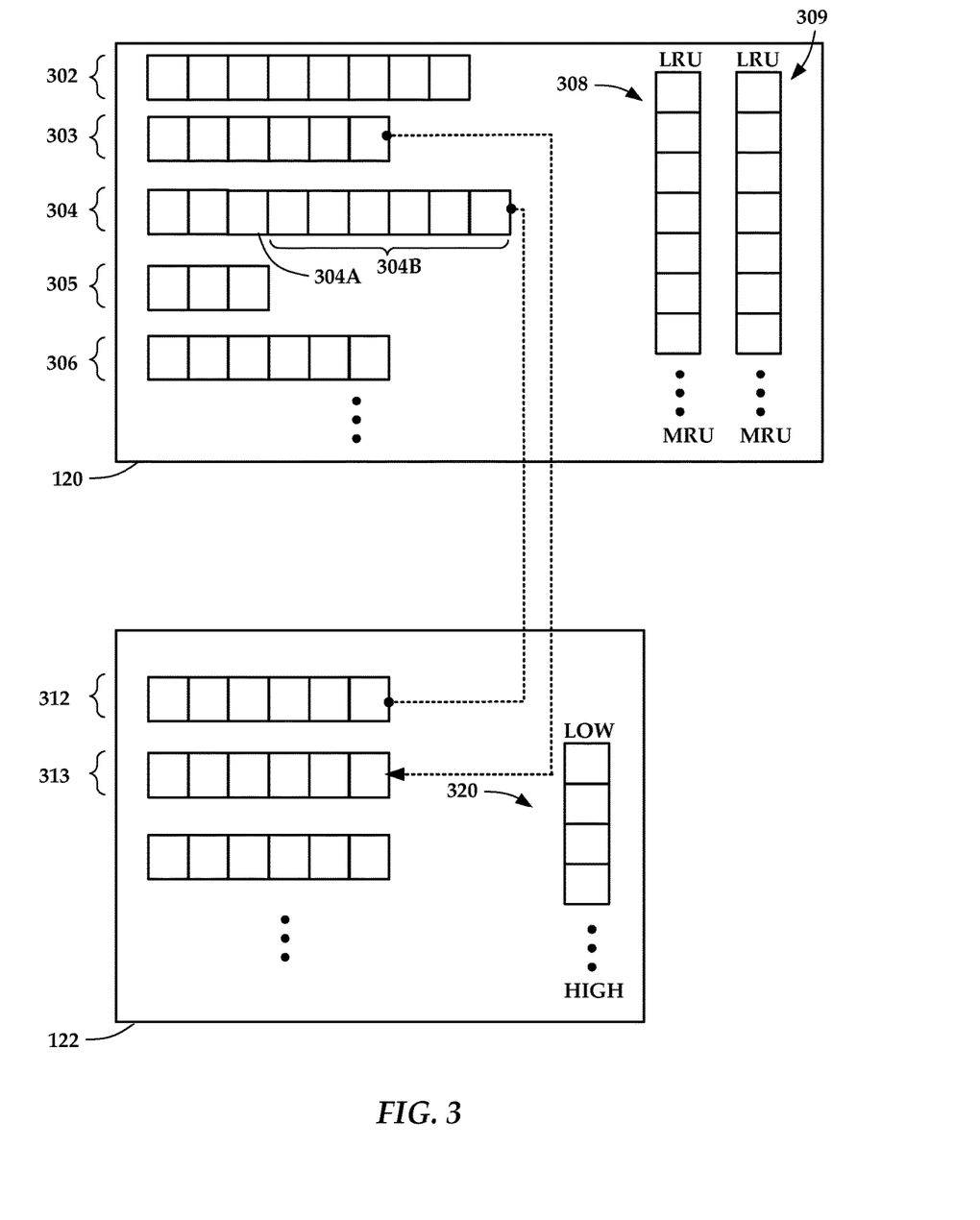
FIG. 3 is a block diagram illustrating further aspects of moving/copying data from a primary cache to a secondary cache according to example embodiments.

In reference now to FIG. 3, a block diagram illustrates an example of how segments are selected and retained for primary cache 120. The primary cache 120 distinguishes read data from write data. Read data may be distinguished from write data by assigning a cache use identifier to primary cache segments. For example, segments 302-306 are identified as read data that are available for movement to the secondary cache 122. In this example, each block within the segments 302-306 represents a unit of data, e.g., n-LBAs, where n is the same for all segments 302-306. The blocks with the segments 302-306 are also linked together, e.g., a contiguous range of LBAs within each segment 302-306. The primary cache 120 may also have write data, and it is assumed in this example that the secondary cache is populated only with read data from segments in the primary cache.

The process of searching for new read data to copy into secondary cache may be initiated when new valid read data is added to the primary cache 120. This search may also be dependent of the host read history spatial locality being high, which can be determined via the analysis controller module 126 and/or database 132. Generally, spatial locality refers to grouping of a relatively large number of requests over a relatively small range of LBAs and over a particular time range. High spatial locality of requests may be indicative that data in or near that range may be read or re-read at some point in the future. The likelihood of some of the data being requested near-term may not be high enough to justify storage in the primary cache 120, but might be sufficient to move the data to the larger secondary cache 122.

A retention priority is used to guide the selection of segments 302-306 that have eligible data for the secondary cache 122. The retention priority of the segments 302-306 in the primary cache will be lowered when all possible data from that segment 302-306 have been copied into secondary cache. For example, segment 303 is shown having all data copied to segment 313 in the secondary cache 122, and so segment 303 will have a low (or zero) retention priority. In such a case, a reference to the segment 303 may be maintained in a sorted list, and a low retention priority relative to other segments causes segment 303 to be at the top of the list for removal.

Read data that is not yet copied to the secondary cache 122 is given higher retention priority, while read data that has been copied to secondary cache is given lower retention priority. A primary cache segment may include some portions that have been copied, and others that have not been. Other retention priority relates to the last access time of LBAs within the segment.

One way to manage retention priority is to store a reference to eligible segments on one or more lists 308-309. For example, the lists 308-309 may have a collection of elements each referencing segments 302-306. Additional data may also be stored with the list elements, such as access time, cache priority, etc. Lists 308 and 309 are ordered from least-recently-used (LRU) to most-recently-used (MRU), based on cache use of at least part of the segment. These lists 308-309 may be combined into a single list (e.g., sorted on primary and secondary fields, use a combined sorting value), or be used to collectively to define a retention priority. When an eviction is necessary, the lists 308-309 may be consulted in order of retention priority, the lowest priority elements being at the top of the lists 308-309.

The elements placed in the lists 308-309 may be limited to read segments (e.g., using cache use identifier noted above) that are not yet copied to the secondary cache 122. This can provide boundaries on the search for candidate segments to move to the secondary cache 122. In order to qualify for selection, the segment may need to satisfy any or all of the following criteria: (a) not already be reserved for copying to secondary cache (b) not prohibited from being copied to secondary cache; (c) not already copied to secondary cache, (d) overlap with the range of LBAs that may be copied into secondary cache, and (e) contain at least one full cluster within its LBA range (for implementations in which the secondary cache is organized into fixed sized clusters); (f) contain data supplied by a read look-ahead or read look-behind operation, or have a maximum cache importance that is greater than or equal to that of any LBA predicted to be evicted from the secondary cache if qualifying segment data were copied into secondary cache. The last criteria relates to additional speculative reading that may have been performed expressly for the purpose of promoting to secondary cache. In that case, a cache importance eviction test may have already been performed at the time the speculative reading was being determined, and the data would already have been marked "promotion recommended".

Criterion (a) above refers to a segment being reserved but not yet having been copied to the secondary cache 122. For example, segments already included in the lists 308-309 that have not yet been copied over would not need to be further considered for addition to the list(s). If an when such segment is copied to the secondary cache 122, it would be removed from list(s) 308-309, and while still resident in the secondary cache 122, would not later be added in to the list(s) 308-309 due to criteria (c).

Criterion (b) refers to situations where the number of LBAs to copy into the secondary cache 122 from a single segment has a maximum value that may be smaller than some segments. When that is the case, the range of data to copy is selected in a way that gives priority to the lowest non-requested LBAs in the segment. The lowest non-requested LBA is maintained within the segment by the primary cache. When such a segment is returned to primary cache, it remains on the list of read segments (rather than being moved to the list of segments already copied to secondary cache) and is marked as prohibited from copying to secondary cache.

For example, a high-water mark may be maintained of the last requested LBA within each read segment of the primary cache 120. When a limit is imposed on the amount of data that may be copied into secondary cache from a single segment, the data selected from that segment is chosen to give higher priority to non-requested LBAs over requested LBAs, and highest priority to the lowest non-requested LBAs. Using segment 304 as an example, LBAs from the beginning (leftmost end) of the segment 304 up to and including block 304A have been requested. Further, as shown with cache line 312 in the secondary cache, the cluster size of the secondary cache 122 is six blocks. As a result, region 304B is given priority for copying into the secondary cache 122 over any other region of segment 304. If the segment 304 extended beyond the end of region 304B (e.g., there was another range of LBAs to the right of 304B) then 304B would be given priority over that other range.

There may be a maximum LBA range that is permitted to be copied into secondary cache. Criterion (d) enforces that some part of the segment is within the allowable range. The LBA range to be copied from the segment may be truncated if necessary.

Criterion (e) relates to selecting data for the secondary cache 122 that satisfies an address criterion of the secondary cache. For example, eligible segments may include those that satisfy a minimum size, e.g., fully filling out one or more cache lines. Also, a secondary cache cluster may define both alignment and size constraints of the LBA ranges that may be copied into secondary cache 122, assuming that it is organized into fixed size cache lines. For example, if the cluster size is 30 LBAs, then any LBA range to be copied into secondary cache should have a starting LBA and number of LBAs that are each multiples of 30. Using $LBA_S$ and $LBA_F$ as respective start and final addresses of the segment, the addresses in this example may have to satisfy the following (where "%" represents the integer modulus operator): $LBA_S\% 30=0$ and $(LBA_F-LBA_S+1) \% 30=0$. After selecting a segment, its LBA range may further be adjusted to comply with the cluster alignment/size requirements. For example, the start LBA is rounded up to the nearest cluster boundary if not already aligned, and the end LBA is rounded down to the nearest cluster boundary −1, if not already so aligned. If that is not possible, then the segment may be disqualified.

Criterion (f) relates to an algorithm for filling the primary cache 120 with speculative data, as discussed in U.S. patent application Ser. No. 13/543,036. Speculative data generally refers to data that is adjacent to data of an existing host access operation (e.g., sectors preceding and following read-requested sectors) that are not currently requested but are read anyway. By loading speculative data into the cache, latency of future requests for speculatively cached data can be greatly reduced.

When determining candidates for copying to the secondary cache, a secondary cache eviction test may be performed if it was not already performed during the setup of speculative reading. The test involves comparing the maximum cache importance of the next 'n' clusters to be evicted from the secondary cache 122 to the maximum cache importance of the candidate data to be added. The 'n' value is the maximum size of data that can be added to secondary cache 122 at a time, but may also be matched to the size of the candidate data to be added. Because the secondary cache eviction test may already be performed during set up of speculative reading, it will be marked as "promotion rec-ommended." In such a case, there is no need to do an eviction test again when evaluating that data for promotion into the secondary cache The controller for the caches 120, 122 should be able to service cache hits and invalidations on a primary cache segment while copying that segment's data into the secondary cache 122. Once a segment is selected for copy, it may be reserved for the duration of the copy operation into the secondary cache 122. During this time, the segment can be used to serve cache hits from the primary cache 120 and won't be evicted. If a host issues an invalidate request for that segment, the segment will be disabled for further cache hits, but will otherwise remain intact until the copy into secondary cache completes, at which time the remaining processing for the invalidation can be performed.

A qualifying segment that successfully copies all of its cluster-aligned data into secondary cache 122 will be removed from the list of read segments (e.g., lists 308, 309) and may be added to a list (not shown) of segments already copied to secondary cache 122. Otherwise, the segment remains on the list(s) 308, 309 of available read segments. If criteria (d), (e), or (f) above are not met, the segment is not eligible to be copied to the secondary cache, although at some later time it might be, e.g., if secondary cache priorities are changed.

Figure 4:
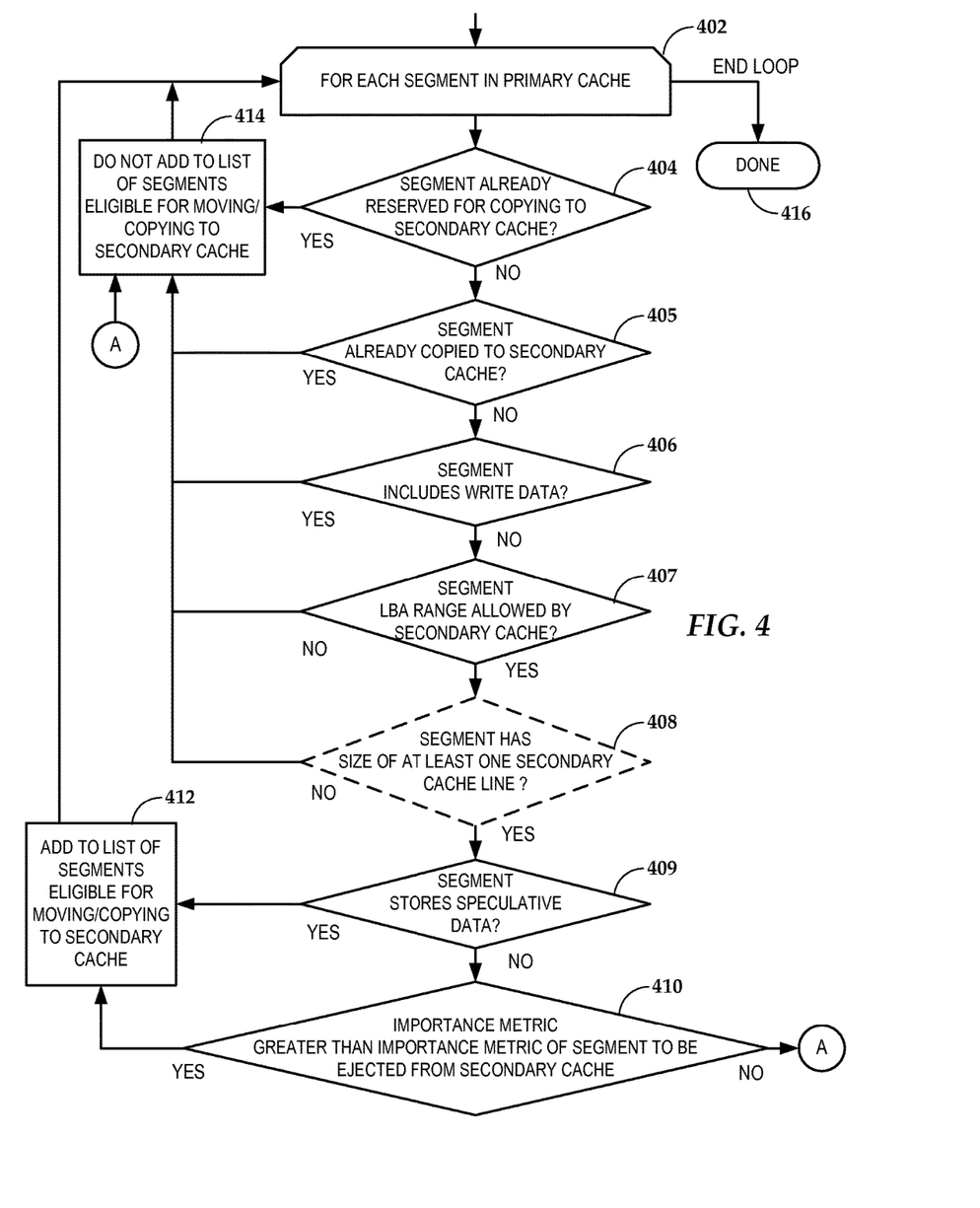
FIG. 4 is a flowchart illustrating a procedure to segments eligible for copying to a secondary cache according to an example embodiment.

In reference now to FIG. 4, a flowchart illustrates a procedure for selecting primary cache segments available for copying to a secondary cache according to an example embodiment. The procedure iterates through all the currently used segments as indicated by loop entry point 402. Alternatively, the loop 402 may iterate just through eligible segments with a "read" usage type, which excludes data of "promoted" or "write" usage types. Decision blocks 404-408 represent criteria (a)-(e) described above. Note that decision block 408 is indicated as optional, based on whether the system is designed to ensure data is selected to fully fill out secondary cache lines. Decision blocks 409-410 relate to criterion (f) above.

Note that if loop 402 only iterates through eligible "read" usage type segments, then the check at 405 may not be needed. However, the check at block 406 may still be used. For example, in some cases "write" data is characterized during idle time, and/or "write" data can be re-characterized as read data via segment merging or other events. In such a case, a segment marked as a "read" usage may still have unverified write data. In such a case, the segment would be disqualified for copying to secondary cache.

If the respective decision blocks 404-410 have the indicated outcomes ("yes" or "no", as appropriate), the selected segment is added 412 to a list of segments eligible for copying to the secondary cache, otherwise the selected segment is not added 414. This repeats for each segment until exiting the loop at 416. It should be noted that the order of decision blocks 404-410 is shown for purposes of example, and can be arranged in any order. For example, the decision blocks 404-410 that most often leads to finishing loop via 414 would be placed first to reduce processing time in the loop 402. After the procedure is completed, the list is updated with primary segments eligible for copy to the secondary cache. This list may be sorted, e.g., based on last access time, primary cache priority, etc. For example, by starting a search with the lowest priority entries and proceeding toward the higher priority entries lowers the probability of losing eligible data to eviction before it gets copied to secondary cache. Segments corresponding to elements at the end of the list (lowest primary cache priority) will be copied to the secondary cache under the appropriate conditions.

Figure 5A:
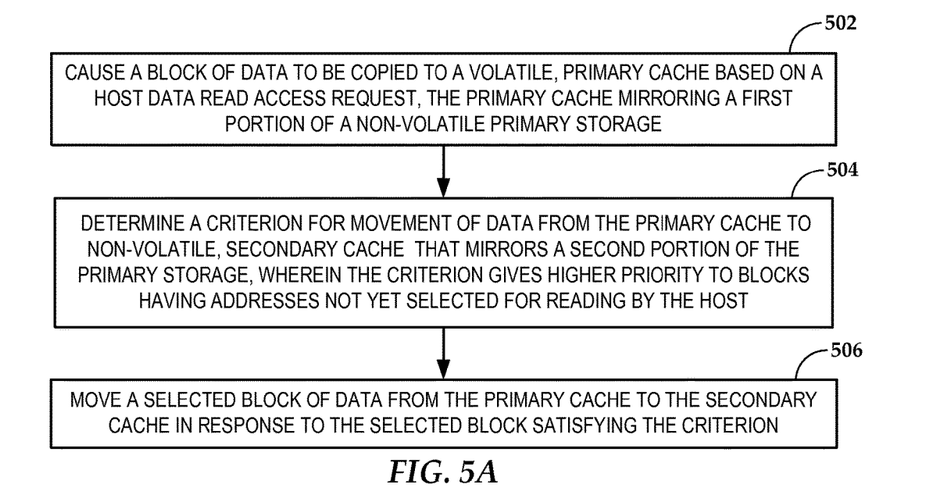
FIGS. 5A-5B are flowcharts of procedures according to example embodiments.

In reference now to FIG. 5A, a flowchart illustrates a procedure according to an example embodiment. The process involves causing 502 a block of data to be copied in a volatile, primary cache based on a host data read access request. The primary cache mirrors a first portion of a non-volatile main storage. The procedure further involves determining 504 a criterion for movement of data from the primary cache to a non-volatile, secondary cache that mirrors a second portion of the main storage. The criterion gives higher priority to blocks having addresses not yet selected for reading by the host. The criterion may also optionally give higher priority to the blocks having the longest elapsed time since last host access. The criterion may optionally prevent the movement of the data based on whether an address range of the blocks overlaps with a range of addresses already copied or reserved for copying to the secondary cache, and/or the data not satisfying a minimum size associated with a cache line of the secondary cache.

In response to the block of data being copied to the primary cache, a selected segment of data is moved 506 from the primary cache to the secondary cache and in response to the selected segment satisfying the criterion. Moving the selected segment of data from the primary cache to the secondary cache may cause a cluster of the secondary cache to be evicted. In such a case, determining the criterion may optionally involve determining whether the selected segment has an equal or higher priority than the evicted cluster. In another arrangement, the secondary cache may be used for storing read data only. In such a case, the criterion may optionally prevent the movement of the data based the segment containing write data.

Figure 5B:
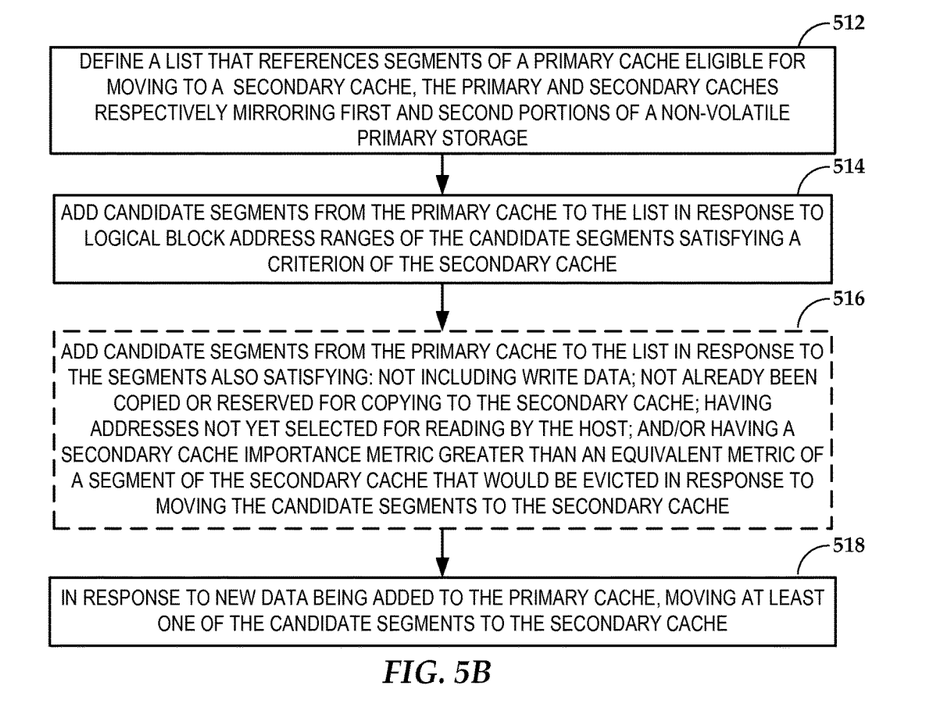

In reference now to FIG. 5B, a flowchart illustrates a procedure according to another example embodiment. The procedure involves defining 512 a list that references segments of a primary cache eligible for moving to a secondary cache. The primary and secondary caches respectively mirroring first and second portions of a non-volatile main storage. The list may include any data structure that stores a collection of data objects, in this example a reference to segments of the primary cache.

Candidate segments from the primary cache are added 514 to the list in response to logical block address ranges of the candidate segments satisfying an address criterion of the secondary cache. The address criterion of the secondary cache may include a cache line size of the secondary cache. In such a case, the candidate segments satisfy the criterion if a size of the candidate segments is greater than or equal to the cache line size. The candidate range may also need to meet alignment requirements relating to the line size of the secondary cache. For example, the address criterion may also include an allowable starting logical block address of a cache line of the secondary cache. In that case, the candidate segments satisfy the criterion if a logical block address of the candidate segments satisfies the allowable starting logical block address. In an arrangement where the secondary cache stores read data only, the candidate segments may be added to the list further based on the candidate segments not including write data.

In optional block 516, additional conditions may be used to add candidate segments from the primary cache. Those conditions may include candidate segments not including write data, not having already been copied or reserved for copying to the secondary cache, having addresses not yet selected for reading by the host, and/or having a secondary cache importance metric greater than an equivalent metric of a segment of the secondary cache that would be evicted in response to moving the candidate segments to the secondary cache.

In response to new data being added to the primary cache, at least one of the candidate segments is moved 518 to the secondary cache. In one arrangement, the list is optionally sorted based on a primary cache priority of the candidate segments. In response to this sorting, candidate segments having a lower cache priority are selected for moving to the secondary cache ahead of candidate segments with a higher cache priority.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a computer-readable medium and transferred to the processor for execution as is known in the art. The structures and procedures shown above are only a representative example of embodiments that can be used to facilitate managing caching in data storage devices as described above.

The foregoing description of the example embodiments has been presented for the purposes of illustration and description. It is not intended to be exhaustive or to limit the inventive concepts to the precise form disclosed. Many modifications and variations are possible in light of the above teaching. Any or all features of the disclosed embodiments can be applied individually or in any combination are not meant to be limiting, but purely illustrative. It is intended that the scope be limited not with this detailed description, but rather determined by the claims appended hereto.

What is claimed is:

1. An apparatus comprising:
   a non-volatile main storage;
   a volatile, primary cache mirroring a first portion of the main storage;
   a non-volatile secondary cache mirroring a second portion of the main storage, wherein the secondary cache is used for storing read data only; and
   a processor configured to:
   cause a new segment of data to be copied to the primary cache in response to a data read access request from a host;
   determine a criterion for copying of data from the primary cache to the secondary cache, wherein the criterion gives segments having addresses not yet selected for reading by the host higher priority than segments having addresses selected for reading by the host; and
   in response to the new segment of data being copied into the primary cache, copy a selected segment of data from the primary cache to the secondary cache in response to the selected segment satisfying the criterion and where the criterion prevents the copying of the selected segment based on the selected segment containing write data.

2. The apparatus of claim 1, wherein the selected segment is copied from the primary cache to the secondary cache further in response to a high spatial locality of recent host requests.

3. The apparatus of claim 1, wherein copying the selected segment of data from the primary cache to the secondary cache would cause a cluster of the secondary cache to be evicted, wherein determining the criterion further comprises whether the selected segment has an equal or higher priority than the cluster.

4. The apparatus of claim 1, wherein the criterion prevents the copying of the selected segment based on whether an address range of the selected segment overlaps with a range of addresses already copied or reserved for copying to the secondary cache.

5. The apparatus of claim 1, wherein the criterion prevents the copying of the selected segment based on the selected segment not satisfying a minimum size and an address alignment associated with a cache line of the secondary cache.

6. A method comprising:
causing a new segment of data to be copied to a volatile, primary cache based on a data read access request from a host, the primary cache mirroring a first portion of a non-volatile main storage;
determining a criterion for copying of data from the primary cache to a non-volatile, secondary cache that mirrors a second portion of the main storage and is used for storing read data only, wherein the criterion gives segments having addresses not yet selected for reading by the host higher priority than segments having addresses selected for reading by the host; and
in response to the new segment of data being copied to the primary cache, causing a selected segment of data to be copied from the primary cache to the secondary cache in response to the selected segment satisfying the criterion and wherein the criterion prevents the copying of the selected segment in response to the selected segment containing write data.

7. The method of claim 6, wherein the selected segment is copied from the primary cache to the secondary cache further in response to a high spatial locality of recent host request.

8. The method of claim 6, wherein copying the selected segment of data from the primary cache to the secondary cache would cause a cluster of the secondary cache to be evicted, wherein determining the criterion further comprises determining whether the selected segment has an equal or higher priority than the cluster.

9. The method of claim 6, wherein the criterion prevents the copying of the data based on whether an address range of the selected segment overlaps with a range of addresses already copied or reserved for copying to the secondary cache.

10. The method of claim 6, wherein the criterion prevents the copying of the data based on the selected segment not satisfying a minimum size and an address alignment associated with a cache line of the secondary cache.

11. A method comprising:
defining a list that references segments of a primary cache eligible for copying to a secondary cache, the primary and secondary caches respectively mirroring first and second portions of a non-volatile main storage and wherein the secondary cache stores read data only;
adding candidate segments from the primary cache to the list in response to logical block address ranges of the candidate segments satisfying an address criterion of the secondary cache wherein the candidate segments are added to the list further based on the candidate segments not including write data; and
in response to new data being added to the primary cache, copying at least one of the candidate segments to the secondary cache.

12. The method of claim 11, wherein the address criterion of the secondary cache comprises a cache line size of the secondary cache, and wherein the candidate segments satisfy the address criterion if a size of the candidate segments is greater than or equal to the cache line size.

13. The method of claim 11, wherein the address criterion of the secondary cache comprises an allowable starting logical block address of a cache line of the secondary cache, and wherein the candidate segments satisfy the address criterion if a logical block address of the candidate segments satisfies the allowable starting logical block address.

14. The method of claim 11, wherein the candidate segments are added to the list further based on the candidate segments having not already been copied or reserved for copying to the secondary cache.

15. The method of claim 11, wherein the candidate segments are added to the list further based on satisfying at least one of the following:
the candidate segments include addresses not yet selected for reading by a host; and
data of the candidate segments have secondary cache importance metrics greater than or equal to an equivalent metric of a cluster of the secondary cache that would be evicted in response to moving at least one of the candidate segments to the secondary cache.

16. The method of claim 11, wherein the list is sorted based on a primary cache priority of the candidate segments so that candidate segments having a lower primary cache priority are selected for moving to the secondary cache ahead of candidate segments with a higher primary cache priority.

* * * * *